(12) United States Patent
Awane et al.

(10) Patent No.: US 9,599,880 B2
(45) Date of Patent: *Mar. 21, 2017

(54) PROJECTION DISPLAY APPARATUS

(71) Applicant: Sony Corporation, Tokyo (JP)

(72) Inventors: Satoru Awane, Tokyo (JP); Hiroyuki Meguro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,676

(22) Filed: Mar. 4, 2016

(65) Prior Publication Data

US 2016/0187766 A1 Jun. 30, 2016

Related U.S. Application Data

(63) Continuation of application No. 13/587,295, filed on Aug. 16, 2012, now Pat. No. 9,316,893.

(30) Foreign Application Priority Data

Aug. 24, 2011 (JP) ................................. 2011-183006

(51) Int. Cl.
*G03B 21/16* (2006.01)
*H04N 9/31* (2006.01)
*G02B 27/00* (2006.01)

(52) U.S. Cl.
CPC ......... *G03B 21/16* (2013.01); *G02B 27/0006* (2013.01); *H04N 9/3144* (2013.01)

(58) Field of Classification Search
CPC ....... G03B 21/16; G03B 21/14; H04N 5/7441
USPC .......... 353/57, 58, 60, 61, 119, 52; 348/748; 361/831
See application file for complete search history.

(56) References Cited

U.S. PATENT DOCUMENTS

| 7,950,811 B2 | 5/2011 | Nagahata et al. |
| 9,316,893 B2 * | 4/2016 | Awane ................... G03B 21/16 |
| 2008/0049193 A1 | 2/2008 | Zheng et al. |

FOREIGN PATENT DOCUMENTS

| JP | 2000-258842 | 9/2000 |
| JP | 2004-109781 | 4/2004 |
| JP | 2004-157347 | 6/2004 |
| JP | 2006-65090 | 3/2006 |
| JP | 2008-170808 | 7/2008 |
| JP | 2008-262061 | 10/2008 |
| JP | 2008-286824 | 11/2008 |

\* cited by examiner

*Primary Examiner* — William C Dowling
*Assistant Examiner* — Ryan Howard
(74) *Attorney, Agent, or Firm* — Frommer Lawrence & Haug LLP

(57) ABSTRACT

A projection display apparatus includes: a substantially box-shaped enclosure having a bottom surface portion, the bottom surface portion having an ventilation groove and an air inlet formed through a wall of the ventilation groove; an air sucking fan provided in the enclosure and forming an air flow flowing through the air inlet into the enclosure, and a filter through which the air flowing through the air inlet into the enclosure passes.

8 Claims, 4 Drawing Sheets

PROJECTION DISPLAY APPARATUS

This is a continuation of application Ser. No. 13/587,295, filed Aug. 16, 2012, which is entitled to the priority filing date of Japanese application(s) 2011-183006, filed Aug. 24, 2011, the entirety of which is incorporated herein by reference.

FIELD

The present disclosure relates to a projection display apparatus, such as a liquid crystal projector and a CRT projector.

BACKGROUND

A projection display apparatus, such as a liquid crystal projector and a CRT projector, has a light source and an optical part that receives light from the light source. Heat generated in the light source raises the temperatures of the light source and the optical part. The projection display apparatus is therefore provided with an air inlet and an air sucking fan for cooling the light source and the optical part.

The air inlet of some of projection display apparatus is formed through a side surface of an enclosure having a substantially box shape. It is, however, difficult to ensure a sufficient opening area of the air inlet formed through a side surface portion of the enclosure. Further, a duct through which air passes needs to be provided between the air inlet and the air sucking fan, disadvantageously preventing the size of the apparatus from being reduced.

To ensure a sufficient opening area of the air inlet, JP-A-2004-157347 proposes a projection display apparatus having an air inlet provided through a bottom surface portion of an enclosure.

How to use a projection display apparatus is classified into the following two ways: A projection display apparatus is either installed on a table or any other installation surface with a top surface portion of the projection display apparatus oriented upward or hung from a ceiling or any other hang surface with a bottom surface portion of the projection display apparatus oriented upward. When a projection display apparatus is hung from a ceiling or any other hang surface with the bottom surface portion oriented upward, the top surface portion designed to be seen is oriented downward and provides a good appearance.

Further, an optical part in a projection display apparatus is typically so disposed that an optical system is oriented obliquely upward (tilt projection) when the projection display apparatus is installed on an installation surface and used. A projection display apparatus hung with the top surface portion thereof oriented upward therefore needs to be so inclined that video images are normally projected on a screen, resulting in a problem because it is difficult to correct trapezoidal distortion of the video images projected from the inclined apparatus.

On the other hand, a projection display apparatus hung with the bottom surface portion thereof oriented upward, which allows the optical system to be oriented obliquely downward, can normally project video images on the screen without having to be inclined. For the reason described above, a typical projection display apparatus, when hung from a hang surface before use, is so installed that the bottom surface portion is oriented upward.

SUMMARY

When the projection display apparatus described in JP-A-2004-157347 is hung from a hang surface before use with the bottom surface portion thereof oriented upward, however, dust disadvantageously accumulates on a filter that blocks the air inlet. When the projection display apparatus is hung from a hang surface before use, it is therefore necessary to attach a canopy-shaped part provided as a separate part so that dust will not accumulate on the filter.

In view of the points described above, it is desirable to provide a projection display apparatus that is hung before use with a bottom surface portion thereof oriented upward but prevents dust from passing through an air inlet or accumulate on a filter without any canopy-shaped part.

A projection display apparatus according to an embodiment of the present disclosure includes an enclosure, an air sucking fan, and a filter.

The enclosure has a substantially box-shape having a bottom surface portion. The bottom surface portion of the enclosure has an ventilation groove and an air inlet formed through a wall of the ventilation groove.

The air sucking fan is provided in the enclosure and forms an air flow flowing through the air inlet into the enclosure.

The filter transmits the air flowing through the air inlet into the enclosure.

When the projection display apparatus according to the embodiment of the present disclosure is installed on an installation surface before use, a top surface portion of the enclosure is oriented upward. On the other hand, when the projection display apparatus according to the embodiment of the present disclosure is hung from a hang surface, the bottom surface portion of the enclosure is oriented upward.

In the projection display apparatus according to the embodiment of the present disclosure, air passes through the ventilation groove provided in the bottom surface portion of the enclosure and enters the enclosure through the air inlet formed through the wall of the ventilation groove.

When the projection display apparatus is hung from a hang surface with the bottom surface portion of the enclosure oriented upward, the ventilation groove is open upward and the air inlet is open sideways. In this state, dust will accumulate in the ventilation groove in the projection display apparatus hung from the hang surface. As a result, dust is not allowed to pass through the air inlet or accumulate on the filter. The life of the filter can therefore be prolonged.

According to the embodiment of the present disclosure, when the projection display apparatus is hung with the bottom surface portion thereof oriented upward before use, dust will not pass through the air inlet or accumulate on the filter without any canopy-shaped part.

DETAILED DESCRIPTION

Figure 1:
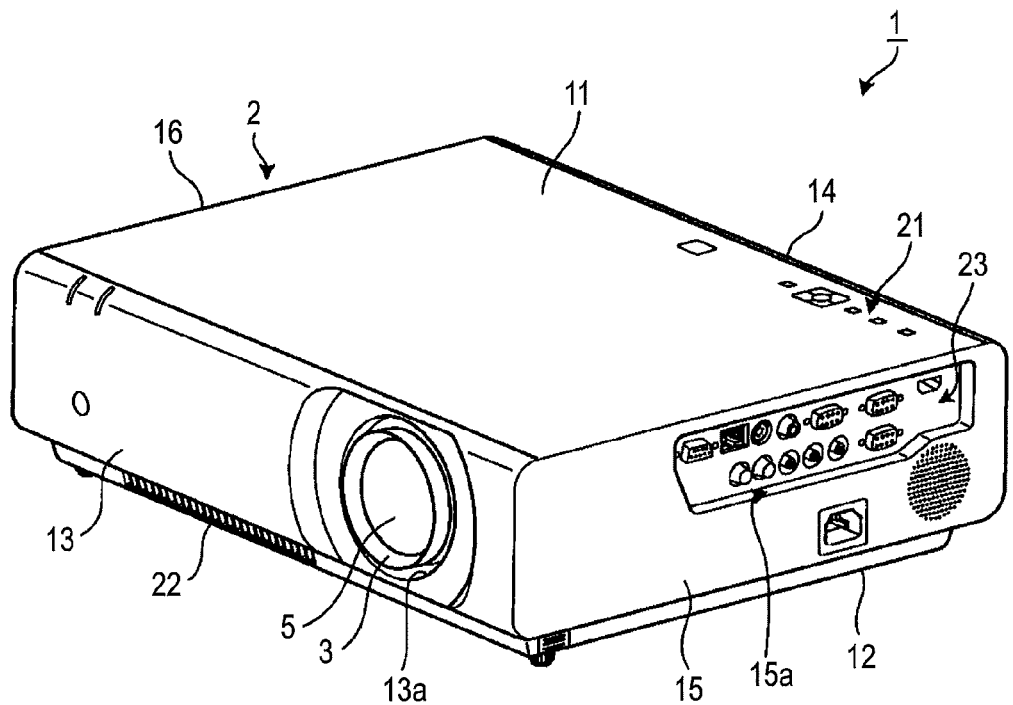
FIG. 1 is a perspective view of a projection display apparatus according to an embodiment of the present disclosure with a top surface portion of the projection display apparatus oriented upward.

A projection display apparatus according to an embodiment of the present disclosure will be described below with reference FIGS. 1 to 6. Common members shown in the drawings have the same reference characters. The projection display apparatus according to the embodiment of the present disclosure is not limited to the following form.

The description will be made in the following order.
1. Schematic configuration of projection display apparatus
2. Configuration of bottom surface portion
3. Configuration of lid
4. Description of dust receiver <1. Schematic Configuration of Projection Display Apparatus>

A schematic configuration of the projection display apparatus will first be described with reference to FIGS. 1 and 2.

Figure 2:
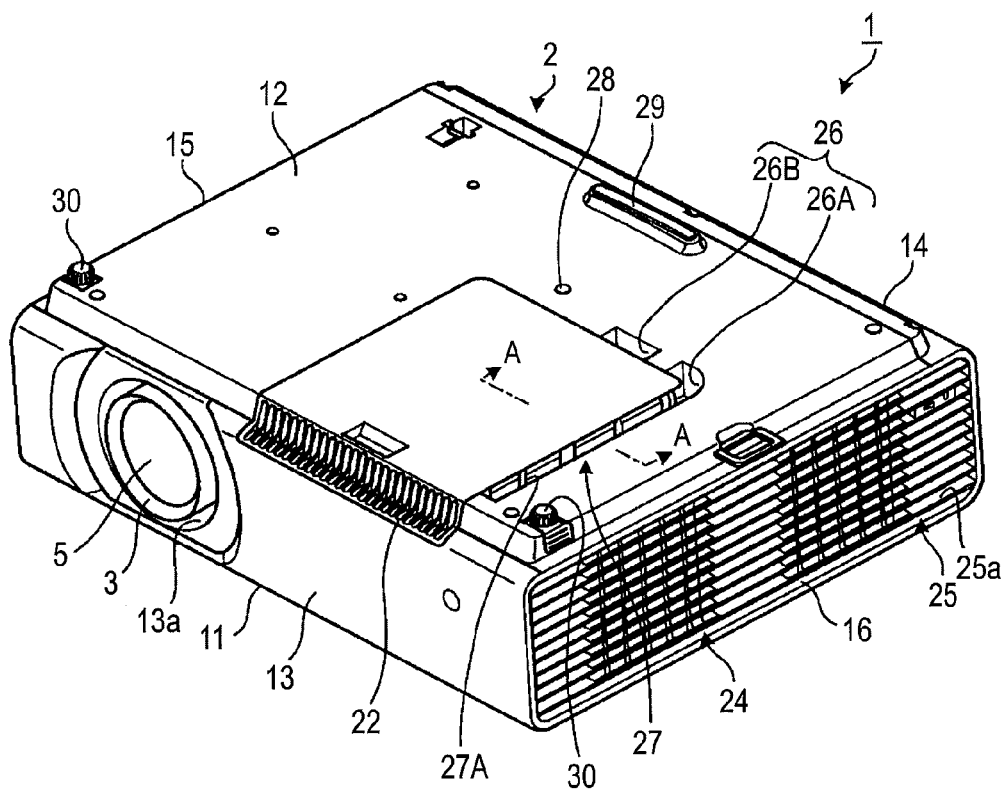
FIG. 2 is a perspective view of the projection display apparatus according to the embodiment of the present disclosure with a bottom surface portion of the projection display apparatus oriented upward.

FIG. 1 is a perspective view of the projection display apparatus with a top surface portion thereof oriented upward, and FIG. 2 is a perspective view of the projection display apparatus with a bottom surface portion thereof oriented upward.

A projection display apparatus 1 includes an enclosure 2 and a lens barrel 3 attached to the enclosure 2, as shown in FIGS. 1 and 2. The lens barrel 3 accommodates a projection lens 5 for projecting light on a screen (not shown). The projection lens 5 may be formed of a lens group including a plurality of lenses.

In the following description, an up-down direction is defined to be the direction perpendicular to the horizontal plane, and a front-rear direction is defined to be a direction substantially parallel to the direction in which the projection lens 5 projects light and perpendicular to the up-down direction. Further, a right-left direction is defined to be the direction perpendicular to the up-down direction and the front-rear direction.

The enclosure 2 has a substantially box-like shape that is thin in the up-down direction and includes a top surface portion 11, a bottom surface portion 12, a front surface portion 13, a rear surface portion 14, and side surface portions 15 and 16. The top surface portion 11 and the bottom surface portion 12 form surfaces substantially perpendicular to the up-down direction, and the front surface portion 13 and the rear surface portion 14 form surfaces substantially perpendicular to the front-rear direction. The side surface portions 15 and 16 form surfaces perpendicular to the right-left direction.

The front surface portion 13, the rear surface portion 14, and the side surface portions 15 and 16 are specific examples of wall surface portions of the enclosure according to the embodiment of the present disclosure.

When the projection display apparatus 1 is installed on a table or any other installation surface before use, the top surface portion 11 of the enclosure 2 is oriented upward (see FIG. 1). When the projection display apparatus 1 is hung from a ceiling or any other hang surface, the bottom surface portion 12 of the enclosure 2 is oriented upward (see FIG. 2).

The enclosure 2 accommodates an air sucking fan 20 (see FIG. 3), which will be described later. In the enclosure 2 are further disposed, although not shown, a light source unit, an optical unit that guides a light flux from the light source unit to the lens barrel 3, a light source driver that drives and controls the light source unit, and a controller/driver that drives and controls the entire projection display apparatus 1 including the optical unit.

The light source unit includes a light source that emits light, a reflector that surrounds the light source and reflects the light emitted from the light source, and a lamp housing that houses the reflector. The light source can, for example, be a high-pressure mercury lamp, a xenon lamp, a metal-halide lamp, or a halogen lamp.

The optical unit includes a plurality of optical parts and a holding case that holds the plurality of optical parts. The plurality of optical parts may include, for example, a polarization conversion element that converts the light flux from the light source unit into a parallelized light flux, an image formation element that decomposes the parallelized light flux into red, green, and blue color light fluxes R, G, B and modulates them, and a prism combiner that combines the modulated color light fluxes R, G, and B.

The image formation element includes, for example, three liquid crystal panels, which change the orientation of liquid crystal molecules in accordance with a video signal inputted from the controller/driver to decompose the parallelized light flux into color light fluxes R, G, and B and modulate them. The prism combiner combines the color light fluxes R, G, and B having been modulated by the image formation element and guides the combined light flux to the lens barrel 3.

The light flux incident on the lens barrel 3 is projected through the projection lens 5 on the screen (not shown). The combined light flux (image) from the prism combiner is thus enlarged and displayed on the screen.

The top surface portion 11 is provided with a plurality of operation buttons 21, such as a power button, a volume control button, and a mode switch button, as shown in FIG. 1. The plurality of operation buttons 21 are arranged at appropriate intervals along the side of the top surface portion 11 on the side where the rear surface portion 14 is present.

The front surface portion 13 has an opening 13a and a wall-side air inlet 22, and the opening 13a exposes the projection lens 5. The opening 13a is formed through the front surface portion in a position shifted toward one end in the right-left direction, and the wall-side air inlet 22 is formed through the front surface portion in a substantially central portion in the right-left direction. The wall-side air inlet 22 will be described later in detail.

The side surface portion 15 has a recess 15a having a substantially rectangular shape elongated in the front-rear direction. In the recess 15a are disposed a plurality of connection terminals 23, such as connectors and plugs for electrically connecting the projection display apparatus 1 to external apparatus.

The side surface 16 has an air outlet 24, as shown in FIG. 2. A louver 25 formed of a plurality of blades 25a is attached to the air outlet 24. Each of the plurality of blades 25a of the louver 25 is formed of a rectangular plate elongated in the front-rear direction. Each of the blades of the louver attached to the air outlet 24 may alternatively be, for example, a rectangular plate elongated in the up-down direction.

The bottom surface portion 12 has a ventilation groove 26, an air inlet 27 formed through the wall of the ventilation groove 26, a plurality of female threaded portions 28, and a support protrusion 29. The ventilation groove 26 is formed in the bottom surface portion 12 in a position shifted from the center thereof to one side in the right-left direction and formed of a first ventilation groove 26A and a second ventilation groove 26B.

The first ventilation groove 26A has a substantially L-like shape and has a straight portion extending in the front-rear direction and a straight portion extending in the right-left direction. The second ventilation groove 26B has a substantially I-like shape and extends in the right-left direction.

In the present embodiment, the width of each of the first ventilation groove 26A and the second ventilation groove 26B is set at about 10 mm. The width of the ventilation groove according to the embodiment of the present disclosure may, however, be set as appropriate.

Figure 6:
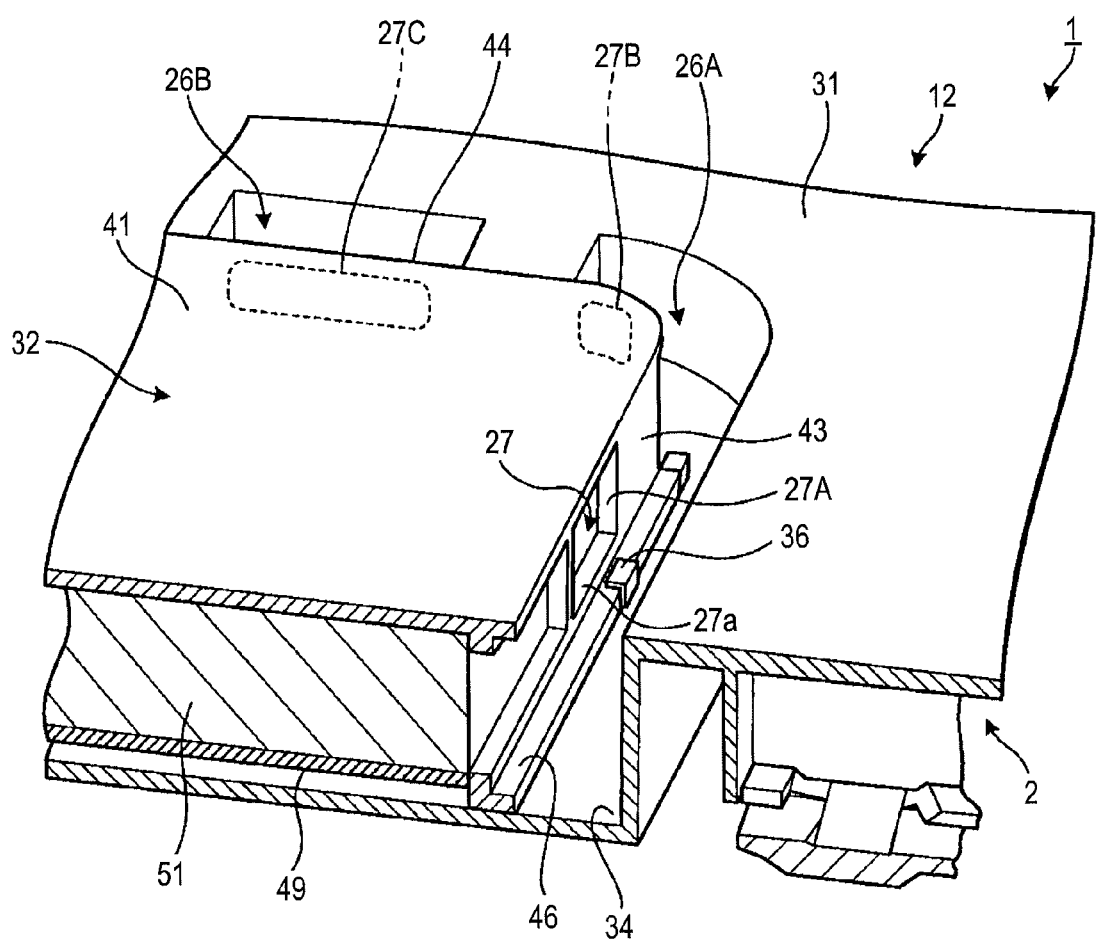
FIG. 6 is a partial cross-sectional view taken along the line A-A in FIG. 2.

The air inlet 27 is formed of first air inlets 27A and 27B formed through the wall of the first ventilation groove 26A and a second air inlet 27C formed through the second ventilation groove 26B (see FIG. 6). That is, the first air inlets 27A and 27B and the second air inlet 27C communicate with the outside via the first ventilation groove 26A and the second ventilation groove 26B.

The first air inlets 27A and 27B and the second air inlet 27C are disposed inside the enclosure 2 with respect to the surface of the bottom surface portion 12. The first air inlet 27A is open sideways or toward the side surface portion 16, and the first air inlet 27B and the second air inlet 27C are open sideways or toward the rear surface portion 14 (rearward).

The plurality of female threaded portions 28 engage with screws (not shown) for attaching a hanging tool (not shown) to the bottom surface portion 12.

The support protrusion 29 has a protruding strip shape and is formed along the side of the bottom surface portion 12 on the side where the rear surface portion 14 is present. The support protrusion 29 comes into contact with an installation surface when the projection display apparatus 1 is installed thereon.

Further, two supports 30 are attached to the corners of the bottom surface portion 12 on the side where the front surface portion 13 is present. The two supports 30 and the support protrusion 29 described above are specific examples of support legs according to the embodiment of the present disclosure. The thus provided two supports 30 and support protrusion 29 create an appropriate gap between the surface of the bottom surface portion 12 and the installation surface, whereby air can be sucked through the first air inlets 27A and 27B and the second air inlet 27C even when the projection display apparatus 1 is installed on the installation surface.

<2. Configuration of Bottom Surface Portion>

The configuration of the bottom surface portion 12 of the enclosure 2 will next be described with reference to FIG. 3.

Figure 3:
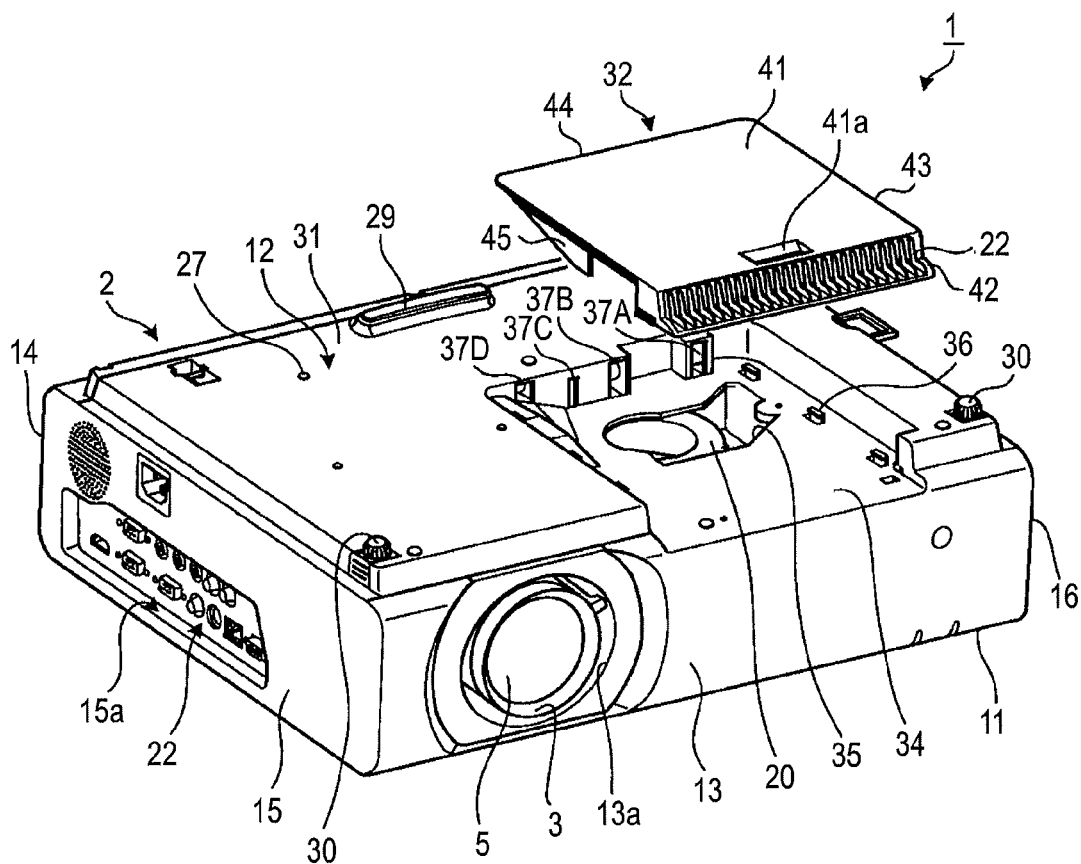
FIG. 3 is an exploded perspective view showing the configuration of the bottom surface portion of the projection display apparatus according to the embodiment of the present disclosure.

FIG. 3 is an exploded perspective view showing the configuration of the bottom surface portion 12.

The bottom surface portion 12 of the enclosure 2 includes a bottom surface portion body 31 and a lid 32 that can be attached to and detached from the bottom surface portion body 31, as shown in FIG. 3.

The bottom surface portion body 31 is seamlessly connected to the front surface portion 13, the rear surface portion 14, and the side surface portions 15 and 16 of the enclosure 2. The bottom surface portion body 31 has a lid attachment recess 34 to which the lid 32 is attached. The lid attachment recess 34 has a substantially square shape and has one side that cuts part of the front surface portion 13.

The lid attachment recess 34 of the bottom surface portion body 31 and the lid 32 form the first ventilation groove 26A and the second ventilation groove 26B described above (see FIG. 2).

The lid attachment recess 34 has an air inlet window 35, a plurality of (three in the present embodiment) engaging tabs 36, and engaging holes 37A, 37B, 37C, and 37D. The air inlet window 35 is provided through the bottom surface of the lid attachment recess 34, and air flowing through the air inlets 27A, 27B, and 27C and the wall-side air inlet 22 passes through the air inlet window 35. The air inlet window 35 exposes the air sucking fan 20 disposed in the enclosure 2.

The air sucking fan 20 is, for example, a sirocco fan and driven to suck air into the enclosure 2. When the air sucking fan 20 is driven, a difference in pressure between the interior and exterior of the enclosure 2 is produced, and air outside of the enclosure 2 flows into the enclosure 2 through the air inlets 27A, 27B, and 27C and the wall-side air inlet 22.

The air having flowed into the enclosure 2 absorbs heat generated in the light source unit, the optical unit, and other components described above and is heated accordingly, whereby the light source unit and the optical unit are cooled. The air heated in the enclosure 2 is discharged out of the enclosure 2 through the air outlet 24 described above.

The plurality of engaging tabs 36 are arranged at appropriate intervals in the front-rear direction along the wall of the lid attachment recess 34 on the side where the side surface portion 16 is present. The plurality of tabs 36 engage with an engaging flange 46 (see FIG. 4), which is provided on the lid 32 and described later.

The number of engaging tabs according to the embodiment of the present disclosure may alternatively be one.

The four engaging holes 37A to 37D are formed through the wall of the lid attachment recess 34 on the side where the rear surface portion 14 is present. The engaging holes 37A to 37D are arranged at appropriate intervals in the right-left direction. Engaging protrusions 47A to 47D (see FIG. 4), which are provided on the lid 32 and described later, are fit into the engaging holes 37A to 37D, respectively.

The lid 32, which slides along the bottom surface portion body 31 toward the front surface portion 13, can be detached from the bottom surface portion body 31. To attach the lid 32 to the bottom surface portion body 31, the lid 32 is inserted into the lid attachment recess 34 of the bottom surface portion body 31 from the side where the front surface portion 13 is present.

<3. Configuration of Lid>

The configuration of the lid 32 will next be described with reference to FIGS. 4 and 5.

Figure 4:
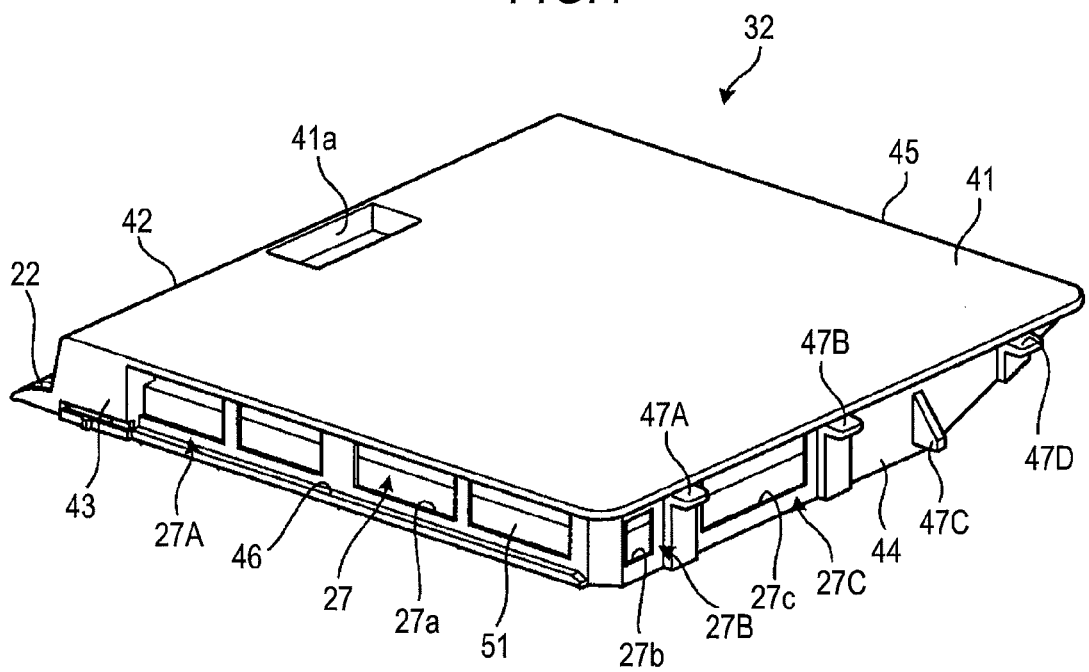
FIG. 4 is a perspective view of a lid of the projection display apparatus according to the embodiment of the present disclosure with one surface of the lid oriented upward.
Figure 5:
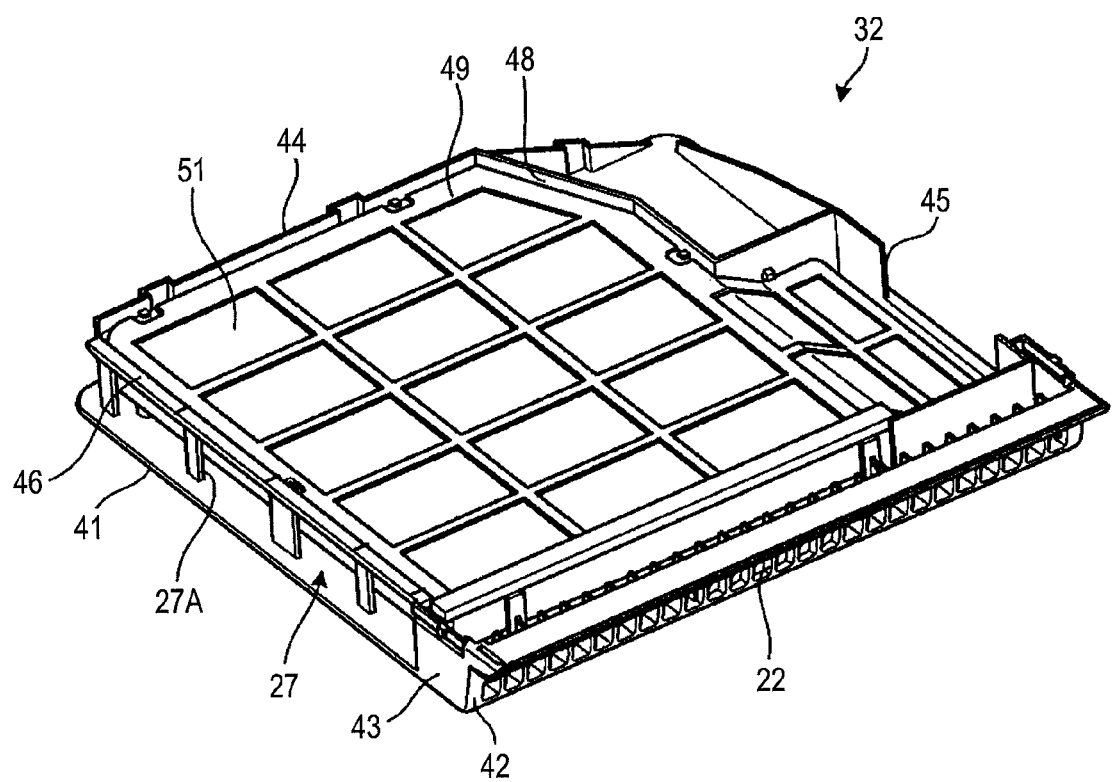
FIG. 5 is a perspective view of the lid of the projection display apparatus according to the embodiment of the present disclosure with the other surface of the lid oriented upward.

FIG. 4 is a perspective view of the lid 32 with one surface thereof oriented upward, and FIG. 5 is a perspective view of the lid 32 with the other surface thereof oriented upward.

The lid 32 has a substantially square, thin box-like shape and the entirety of one flat surface thereof is open, as shown in FIGS. 4 and 5. The area of the flat surface of the lid 32 is smaller than the area of the bottom surface of the lid attachment recess 34 (see FIG. 3) of the bottom surface portion body 31, whereby when the lid 32 is attached to the lid attachment recess 34 of the bottom surface portion body 31, the lid 32 and the lid attachment recess 34 form the first ventilation groove 26A and the second ventilation groove 26B.

The lid 32 has an upper surface portion 41 that form part of the surface of the bottom surface portion 12, a wall-forming surface portion 42 that forms part of the surface of the front surface portion 13, and three lid side surface portions 43, 44, and 45 that face three wall surfaces of the lid attachment recess 34 respectively.

An operation recess 41a is formed in the upper surface portion 41 in a position shifted toward the wall-forming surface portion 42. The thus provided operation recess 41a allows a user's finger or any other similar object to catch and cause the lid 32 to slide along the lid attachment recess 34 (see FIG. 3) of the bottom surface portion body 31.

The wall-forming surface portion 42 has a stepped shape corresponding to the shape of the front surface portion 13 (see FIG. 3) of the enclosure 2. The wall-side air inlet 22 is provided along the wall-forming surface portion 42. The wall-side air inlet 22 is formed of a plurality of elongated holes extending across the stepped portion of the wall-forming surface portion 42.

The lid side surface portion 43, when the lid 32 is attached to the lid attachment recess 34 (see FIG. 3), faces the wall surface of the lid attachment recess 34 on the side where the side surface portion 16 is present. The lid side surface portion 43 has the first air inlet 27A and the engaging flange 46 described above. The first air inlet 27A and the engaging flange 46 face the wall surface of the lid attachment recess 34 on the side where the side surface portion 16 is present with predetermined gaps (about 10 mm in the present embodiment) therebetween.

The first air inlet 27A is formed of a plurality of openings. The plurality of openings, each of which has a rectangular shape, are arranged in the direction in which the wall-forming surface portion 42 and the lid side surface portion 44 face each other.

A bottom side 27a of each of the plurality of openings is set apart from the edge of the lid side surface portion 43 on the opposite side to the upper surface portion 41 by a predetermined length. When the lid 32 is attached to the lid attachment recess 34 (see FIG. 3), the edge of the lid side surface portions 43 on the opposite side to the upper surface portion 41 comes into contact with the bottom surface of the lid attachment recess 34.

In a state in which the lid 32 is attached to the lid attachment recess 34 with the bottom surface portion 12 oriented upward, the bottom side 27a of the first air inlet 27A is therefore located in a position higher than the bottom surface of the lid attachment recess 34 by the predetermined length (see FIG. 6). In other words, the bottom surface of the lid attachment recess 34 is located in a position lower than the bottom side 27a of the first air inlet 27A by the predetermined length.

The engaging flange 46 is provided on the lid side surface portion 43 in a position shifted away from the upper surface portion 41. The engaging flange 46 engages with the plurality of engaging tabs 36 provided on the lid attachment recess 34 when the lid 32 is attached to the lid attachment recess 34.

The lid side surface portion 44 faces the wall surface of the lid attachment recess 34 on the side where the rear surface portion 14 is present when the lid 32 is attached to the lid attachment recess 34. The lid side surface portion 44 has the first air inlet 27B and the second air inlet 27C described above and the four engaging protrusions 47A, 47B, 47C, and 47D. The first air inlet 27B and the second air inlet 27C face the wall surface of the lid attachment recess 34 on the side where the rear surface portion 14 is present with a predetermined gap (about 10 mm in the present embodiment) therebetween.

The first air inlet 27B is disposed at the corner of the lid side surface portion 44 on the side where the lid side surface portion 43 is present and has a rectangular shape. A bottom side 27b of the first air inlet 27B is set at substantially the same height as that of the bottom side 27a of the first air inlet 27A.

The second air inlet 27C is disposed adjacent to the first air inlet 27B with an appropriate distance therebetween and has a rectangular shape. A bottom side 27c of the second air inlet 27C is set at substantially the same height as that of the bottom side 27b of the first air inlet 27B.

The engaging protrusions 47A to 47D protrude from the surface of the lid side surface portion 44 in a direction substantially perpendicular thereto.

The engaging protrusion 47A is disposed between the first air inlet 27B and the second air inlet 27C. The engaging protrusions 47B, 47C, and 47D are shifted toward the lid side surface portion 45 from the second air inlet 27C of the lid side surface portion 44 and arranged at appropriate intervals.

The engaging protrusions 47A to 47D are fit into the engaging holes 37A to 37D provided through the lid attachment recess 34 when the lid 32 is attached to the lid attachment recess 34.

The number of engaging protrusions and engaging holes according to the embodiment of the present disclosure can be arbitrarily set.

The interior of the lid 32 forms a filter attachment portion 48 that accommodates a filter 51, as shown in FIG. 5. The filter attachment portion 48 has a substantially square shape corresponding to the shape of the filter 51. The filter 51 is locked by a filter cover 49 that can be attached to and detached from the filter attachment portion 48.

The filter 51 blocks the first air inlets 27A and 27B, the second air inlet 27C, and the wall-side air inlet 22. The filter 51 further blocks the air inlet window 35 of the enclosure 2. Air flowing into the enclosure 2 through the air inlets 27A, 27B, 27C, and 22 passes through the filter 51. In this process, the filter 51 removes dust and allows only the air to enter the enclosure 2.

To prevent dust from entering the enclosure 2, the filter 51 only needs to block either the air inlets 27A to 27C and 22 or the air inlet window 35 of the enclosure 2.

<4. Description of Dust Receiver>

A dust receiver formed in the first ventilation groove 26A and the second ventilation groove 26B will next be described with reference to FIG. 6.

FIG. 6 is a partial cross-sectional view taken along the line A-A in FIG. 2.

When the lid 32 is attached to the lid attachment recess 34 of the bottom surface portion body 31, the first ventilation groove 26A and the second ventilation groove 26B are formed, as shown in FIG. 6. The ventilation grooves 26A and 26B expose the first air inlets 27A and 27B and the second air inlet 27C. Air outside the enclosure 2 can therefore enter the enclosure 2 through the ventilation grooves 26A and 26B and the air inlets 27A, 27B, and 27C.

When the projection display apparatus 1 is hung from a hang surface with the bottom surface portion 12 of the enclosure 2 oriented upward, the first ventilation groove 26A and the second ventilation groove 26B are oriented upward, and the first air inlets 27A and 27B and the second air inlet 27C are oriented sideways. As a result, dust accumulates in the first ventilation groove 26A and the second ventilation groove 26B of the projection display apparatus 1 hung from the hang surface.

No dust will therefore pass through the first air inlet 27A or 27B or the second air inlet 27C or accumulate on the filter 51 or the amount of dust that pass through the air inlets and accumulates on the filter is reduced without any canopy-shaped part, whereby the life of the filter 51 can be prolonged.

The bottom surfaces of the first ventilation groove 26A and the second ventilation groove 26B are located in positions lower than the first air inlets 27A and 27B and the second air inlet 27C. The region from the bottom surfaces of the ventilation grooves 26A and 26B to the bottom sides 27*a*, 27*b*, and 27*c* of the first air inlets 27A and 27B and the second air inlet 27C therefore forms a dust receiver where dust accumulates.

Dust that accumulates in the dust receiver is located in a position lower than the first air inlets 27A and 27B and the second air inlet 27C. No dust that accumulates in the dust receiver will therefore be sucked through the first air inlet 27A or 27B or the second air inlet 27C when the air sucking fan 20 (see FIG. 3) is driven to suck air.

The longer the distance from the bottom surfaces of the ventilation grooves 26A and 26B to the bottom sides 27*a*, 27*b*, and 27*c* of the first air inlets 27A and 27B and the second air inlet 27C, the deeper the depth of the dust receiver and hence the greater the capacity of the dust receiver. Further, the wider the width of each of the ventilation grooves 26A and 26B, the greater the capacity of the dust receiver. However, the wider the ventilation grooves 26A and 26B, the more readily dust enters the ventilation grooves 26A and 26B. The depth of the dust receiver is therefore preferably increased to increase the capacity of the dust receiver.

In the present embodiment, the air inlets 27A, 27B, and 27C are provided in part of the lid side surface portions 43, 44, and 45 of the lid 32, and the ventilation grooves 26A and 26B are formed only in the portions where the air inlets 27A, 27B, and 27C are provided. The configuration described above not only provides spaces in the enclosure 2 where the light source unit, the optical unit, and other components are disposed but also reduces the size of the apparatus.

The air inlets according to the embodiment of the present disclosure can alternatively extend across the lid side surface portions 43, 44, and 45 of the lid 32.

In the present embodiment, the ventilation grooves 26A and 26B are formed only in the portions where the air inlets 27A, 27B, and 27C are provided. The ventilation grooves according to the embodiment of the present disclosure are not necessarily formed in the portions where the air inlets are provided but may alternatively be formed in other portions.

In the present embodiment, the filter 51 is attached to the lid 32. The projection display apparatus 1 according to the embodiment of the present disclosure may alternatively be so configured that the filter is attached to the bottom surface portion body 31 to prevent dust from entering the enclosure 2.

In the present embodiment, the bottom surface portion 12 of the enclosure 2 is formed of the bottom surface portion body 31 and the lid 32, and the air inlets 27A, 27B, and 27C are provided in the lid 32. The bottom surface portion of the enclosure according to the embodiment of the present disclosure does not necessarily include a lid. In this case, a ventilation groove having an air inlet formed through a wall thereof is provided in the bottom surface portion of the enclosure.

In the present embodiment, the lid 32 has the wall-forming surface portion 42, which forms part of the front surface portion 13 of the enclosure 2. Alternatively, the wall-forming surface portion according to the embodiment of the present disclosure may form part of the rear surface portion or the side surface portions, which are the wall surface portions of the enclosure.

The present disclosure may be implemented as the following configurations.

(1) A projection display apparatus including a substantially box-shaped enclosure having a bottom surface portion, the bottom surface portion having an ventilation groove and an air inlet formed through a wall of the ventilation groove, an air sucking fan provided in the enclosure and forming an air flow flowing through the air inlet into the enclosure, and a filter through which the air flowing through the air inlet into the enclosure passes.

(2) The projection display apparatus described in (1), wherein a bottom surface of the ventilation groove is located in a position lower than the air inlet when the bottom surface portion of the enclosure is oriented upward.

(3) The projection display apparatus described in (1) or (2), wherein the ventilation groove is formed only in a portion where the air inlet is provided.

(4) The projection display apparatus described in any of (1) to (3), wherein the bottom surface portion of the enclosure includes a bottom surface portion body and a lid that can be attached to and detached from the bottom surface portion body, the bottom surface portion body includes a lid attachment recess to which the lid is attached and an air inlet window formed through the lid attachment recess, the lid attachment recess along with the lid forming the ventilation groove, and the lid has the air inlet.

(5) The projection display apparatus described in (4), wherein the air inlet is formed through part of a side surface of the lid.

(6) The projection display apparatus described in (4) or (5), wherein the lid has a filter attachment portion to which the filter is attached.

(7) The projection display apparatus described in any of (4) to (6), wherein the lid has a wall-forming surface portion that forms at least part of a wall surface portion of the enclosure that is seamlessly connected to the bottom surface portion, and the wall-forming surface portion has a wall-side air inlet that differs from the air inlet.

(8) The projection display apparatus described in any of (1) to (7), wherein the bottom surface portion of the enclosure has a support leg that comes into contact with an installation surface.

The projection display apparatus according to the embodiment of the present disclosure has been described above along with advantageous effects thereof. It is, however, noted that the projection display apparatus according to the present disclosure is not limited to the embodiment described above but a variety of variations can be implemented to the extent that they do not depart from the substance of the present disclosure set forth in the claims.

The present disclosure contains subject matter related to that disclosed in Japanese Priority Patent Application JP 2011-183006 filed in the Japan Patent Office on Aug. 24, 2011, the entire contents of which are hereby incorporated by reference.

What is claimed is:

1. A projection display apparatus comprising:
an enclosure having at least one surface portion, the at least one surface portion having a ventilation groove, an air inlet formed through a wall of the ventilation groove, the at least one surface portion including a lid attachment recess;
a lid attachable to the lid attachment recess and detachable from the lid attachment recess, wherein the at least one surface portion and the lid are substantially coplanar when the lid is attached to the lid attachment recess; and wherein the lid and lid attachment recess form the ventilation groove, wherein the lid further includes an air inlet that is disposed outside of the ventilation groove.

2. The projection display apparatus according to claim 1, wherein a surface of the ventilation groove is located in a stepped position relative to the air inlet when the at least one surface portion of the enclosure is oriented in an upward direction.

3. The projection display apparatus according to claim 1, wherein the ventilation groove is formed only in a portion where the air inlet is provided.

4. The projection display apparatus according to claim 1, wherein an air inlet window is formed through the lid attachment recess, and the lid has the air inlet.

5. The projection display apparatus according to claim 4, wherein the air inlet is formed through part of a side surface of the lid.

6. The projection display apparatus according to claim 1, further comprising a fan provided in the enclosure and configured to form an air flow flowing through the air inlet into the enclosure.

7. The projection display apparatus according to claim 1, further comprising a filter through which passes air flowing through the air inlet flows into the enclosure.

8. A projection display apparatus comprising:
an enclosure having at least one surface portion, the at least one surface portion having a ventilation groove, an air inlet formed through a wall of the ventilation groove, the at least one surface portion including a lid attachment recess; and
a lid attachable to the lid attachment recess and detachable from the lid attachment recess, wherein the at least one surface portion and the lid are substantially coplanar when the lid is attached to the lid attachment recess,
wherein the lid and lid attachment recess form the ventilation groove,
wherein an air inlet window is formed through the lid attachment recess, and the lid has the air inlet, and
wherein the lid has a filter attachment portion to which a filter is attached.

* * * * *